United States Patent
Ho et al.

(10) Patent No.: US 9,218,448 B2
(45) Date of Patent: Dec. 22, 2015

(54) RESISTIVE CAPACITANCE DETERMINATION METHOD FOR MULTIPLE-PATTERNING-MULTIPLE SPACER INTEGRATED CIRCUIT LAYOUT

(71) Applicant: TAIWAN SEMICONDUCTOR MANUFACTURING COMPANY, LTD., Hsinchu (TW)

(72) Inventors: Chia-Ming Ho, Hsinchu (TW); C. Y. Chen, Hsinchu (TW); Hsiu-Wen Hsueh, Taichung (TW); Jun-Fu Huang, Zhunan Township (TW); Shao-Heng Chou, Taichung (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/158,968

(22) Filed: Jan. 20, 2014

(65) Prior Publication Data

US 2015/0205905 A1 Jul. 23, 2015

(51) Int. Cl.
G06F 17/50 (2006.01)

(52) U.S. Cl.
CPC ........ *G06F 17/5081* (2013.01); *G06F 17/5009* (2013.01); *G06F 2217/06* (2013.01); *G06F 2217/12* (2013.01)

(58) Field of Classification Search
USPC .......................................................... 716/52
See application file for complete search history.

(56) References Cited

U.S. PATENT DOCUMENTS

| | | | |
|---|---|---|---|
| 2009/0077507 A1* | 3/2009 | Hou et al. ........................ | 716/4 |
| 2010/0115489 A1* | 5/2010 | Song et al. ...................... | 716/19 |
| 2013/0061183 A1* | 3/2013 | Abou Ghaida et al. ......... | 716/52 |
| 2013/0198696 A1* | 8/2013 | Wang et al. ..................... | 716/51 |
| 2013/0275927 A1* | 10/2013 | Su et al. .......................... | 716/53 |
| 2014/0038085 A1* | 2/2014 | Chern et al. ..................... | 430/5 |

* cited by examiner

*Primary Examiner* — Paul Dinh
*Assistant Examiner* — Bryce Aisaka
(74) *Attorney, Agent, or Firm* — Hauptman Ham, LLP

(57) ABSTRACT

A method comprises generating a plurality of multiple patterning decompositions associated with a layout of an integrated circuit. Each of the plurality of multiple patterning decompositions comprises a first pattern associated with a first mask, a second pattern associated with a second mask, the first mask and the second mask being two masks of a multiple patterning mask set, a width value associated with at least one of the first pattern or the second pattern, and a spacing value between the first pattern and the second pattern. A file is generated comprising a plurality of dielectric constant values associated with the plurality of multiple patterning decompositions that are based on the width values and the spacing values.

20 Claims, 9 Drawing Sheets

FIG. 6

| A-A | S1 | S2 | S3 |
|-----|----|----|----|
| W1 | K11_nom | K11_nom | K11_nom |
| W2 | K11_nom | K11_nom | K11_nom |
| W3 | K11_nom | K11_nom | K11_nom |

503a

| B-A | S1 | S2 | S3 |
|-----|----|----|----|
| W1 | K11_worst | K12_worst | K13_worst |
| W2 | K21_worst | K22_worst | K23_worst |
| W3 | K31_worst | K32_worst | K33_worst |

503b

| C-A | S1 | S2 | S3 |
|-----|----|----|----|
| W1 | K11_worst | K12_worst | K13_worst |
| W2 | K21_worst | K22_worst | K23_worst |
| W3 | K31_worst | K32_worst | K33_worst |

503c

| A-B | S1 | S2 | S3 |
|-----|----|----|----|
| W1 | K11_worst | K12_worst | K13_worst |
| W2 | K21_worst | K22_worst | K23_worst |
| W3 | K31_worst | K32_worst | K33_worst |

503d

| B-B | S1 | S2 | S3 |
|-----|----|----|----|
| W1 | K11_nom | K11_nom | K11_nom |
| W2 | K11_nom | K11_nom | K11_nom |
| W3 | K11_nom | K11_nom | K11_nom |

503e

| C-B | S1 | S2 | S3 |
|-----|----|----|----|
| W1 | K11_worst | K12_worst | K13_worst |
| W2 | K21_worst | K22_worst | K23_worst |
| W3 | K31_worst | K32_worst | K33_worst |

503f

| A-C | S1 | S2 | S3 |
|-----|----|----|----|
| W1 | K11_worst | K12_worst | K13_worst |
| W2 | K21_worst | K22_worst | K23_worst |
| W3 | K31_worst | K32_worst | K33_worst |

503g

| B-C | S1 | S2 | S3 |
|-----|----|----|----|
| W1 | K11_worst | K12_worst | K13_worst |
| W2 | K21_worst | K22_worst | K23_worst |
| W3 | K31_worst | K32_worst | K33_worst |

503h

| C-C | S1 | S2 | S3 |
|-----|----|----|----|
| W1 | K11_nom | K11_nom | K11_nom |
| W2 | K11_nom | K11_nom | K11_nom |
| W3 | K11_nom | K11_nom | K11_nom |

503i

601

RESISTIVE CAPACITANCE DETERMINATION METHOD FOR MULTIPLE-PATTERNING-MULTIPLE SPACER INTEGRATED CIRCUIT LAYOUT

BACKGROUND

Device manufacturers are challenged to deliver value and convenience to consumers by, for example, providing integrated circuits that offer quality performance. Multiple patterning is a technology developed for lithography to enhance feature density. Typically, for forming features of integrated circuits on wafers, a lithography process is used. Lithography processes involve applying a photoresist and defining patterns in the photoresist. The patterns in the patterned photoresist are first defined in a lithography mask, and are implemented either by transparent portions or by opaque portions in the lithography mask. The patterns in the patterned photoresist are then conventionally transferred to manufactured features.

With the increasing down-scaling of integrated circuits, the optical proximity effect poses a growing problem. When two separate features are too close to each other, the optical proximity effect sometimes causes the features to short each other. Multiple patterning technology has been introduced to form closely located features by using at least two masks of a double-patterning mask set. Both masks are used to expose the same photoresist in a lithography process. In each of the masks, the distances between features are increased over the distances between features in the otherwise single mask. As such, the optical proximity effect is reduced, or substantially eliminated.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

FIG. 6 illustrates a techfile associated with a triple patterning integrated circuit layout, in accordance with one or more embodiments;

DETAILED DESCRIPTION

The following disclosure provides many different embodiments, or examples, for implementing different features of the invention. Specific examples of components and arrangements are described below to simplify the present disclosure. These are examples and are not intended to be limiting.

In advanced multiple patterning lithography processes, spacers are applicable for defining narrow metal lines to achieve smaller pitch requirements of advanced process nodes. For example, a first pattern and a second pattern formed by a multiple patterning lithography process are spaced from one another by a design spacing S. The design spacing S; however, sometimes varies as a result of production errors such as shifting of a first mask and a second mask associated with the first pattern and the second pattern during or before the lithography process. Such shifting often introduces an overlay (OVL) misalignment phenomenon. For example, a shift in positioning might cause a spacing less than the design spacing S. A spacing less than the design spacing S results in either a positive spacing value or an overlap. A positive spacing value less than the design spacing S, or a spacing that results in an overlap, sometimes causes a variation in a metal width that deviates from a designed pattern. A shift of the first mask and/or the second mask might alternatively cause a spacing greater than the design spacing S.

In either case, the OVL misalignment phenomenon causes a parasitic resistive capacitance between the first pattern and the second pattern. Parasitic resistive capacitance causes a random variation effect which leads to different performance behavior in a device formed by the multiple patterning lithography process. Such differing performance is sometimes exemplified in a design corner simulation.

Determining the parasitic resistive capacitance caused by variables such as shifting and misalignment is difficult to ascertain during a simulation of an integrated circuit design and/or during a performance simulation of a manufactured device.

Figure 1:
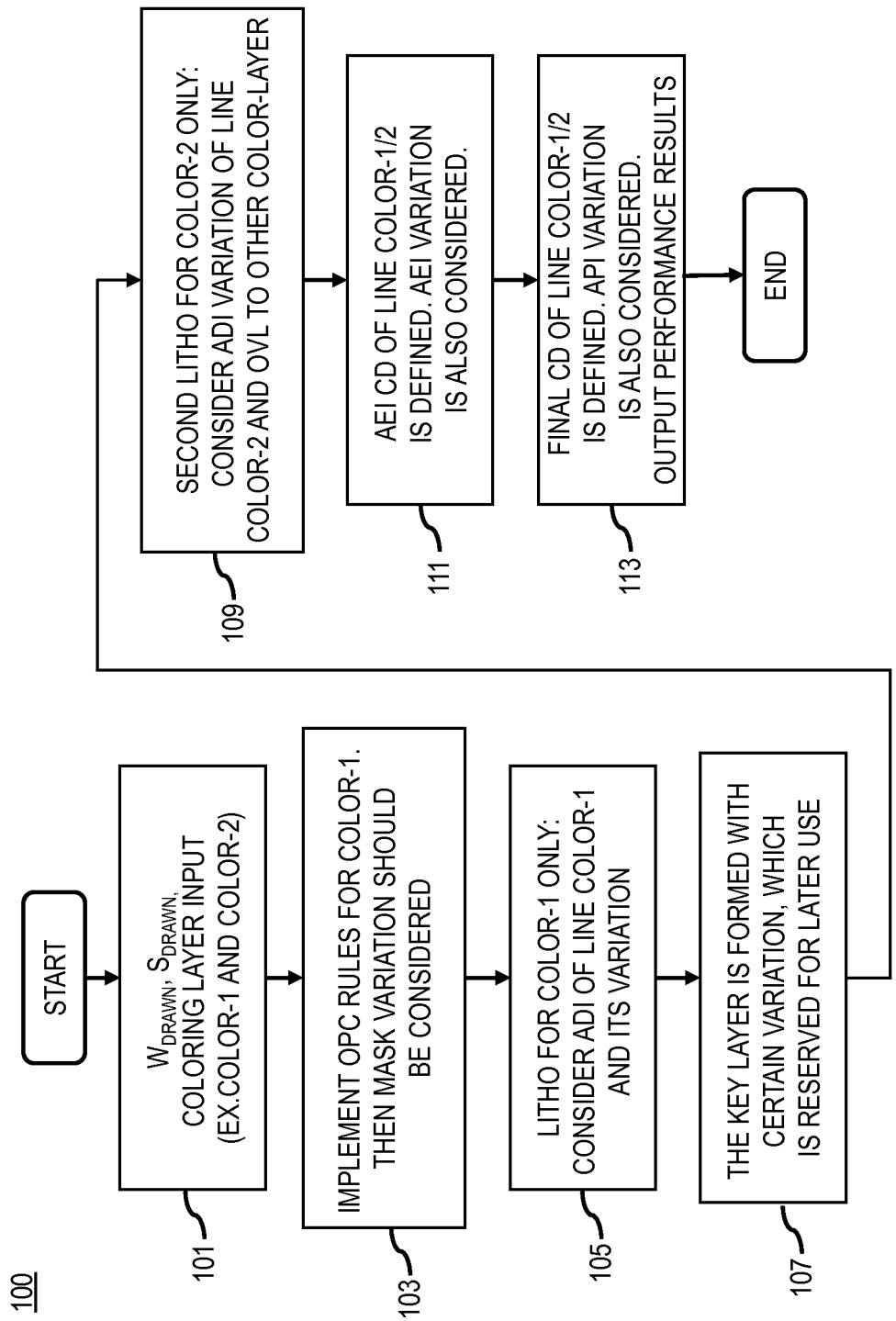
FIG. 1 is a flowchart of a method of modeling the effects caused by variations in pattern width and the overlay misalignment phenomenon, in accordance with one or more embodiments.

FIG. 1 is a flowchart of a method 100 of modeling the effects caused by variations in pattern width and the overlay misalignment phenomenon, in accordance with one or more embodiments. Method 100 begins with step 101 in which a processor such as processor 803 (FIG. 8) or a control module implemented in chip set 800 (FIG. 8), executes an instruction to, using an electronic design automation (EDA) tool, draw a layout of an integrated circuit having at least a first pattern and a second pattern. The first pattern is drawn having a first pattern width and the second pattern is drawn having a second pattern width. The first pattern and the second pattern are drawn such that the first pattern and the second pattern are separated by a spacing. The first pattern is drawn having a first color and the second pattern is drawn having a second color.

In step 103, one or more optical proximity correction rules are implemented for the first color, and variation such as a shifting of a first mask associated with the first pattern and/or a second mask associated with the second pattern is considered.

In step 105, a first lithography process is performed or simulated for the first pattern having the first color in consideration of any determined exposure variation that causes an after-development-inspection critical dimension (ADI CD)

variation, and the potential device performance variation caused by the determined exposure variation.

In step 107, a key layer is formed or simulated with the determined mask variation, and is saved for a later process.

In step 109, a second lithography process is performed or simulated for the second pattern having the second color in consideration of any determined mask variation associated with the determined shifting and/or a determined exposure variation. The determined shifting is considered to correct for the OVL misalignment phenomenon.

In step 111, an etching process is performed or simulated, an after-etching-inspection critical dimension (AEI CD) of the first pattern and the second pattern based on the first color and the second color is defined, and any AEI CD variation is considered.

In step 113, other process steps are performed or simulated such as copper plating and/or chemical mechanical polishing (CMP) process, final CD of the first pattern and the second pattern based on the first color and the second color is defined, any determined after-process-inspection critical dimension (API CD) variation are also considered, and the EDA system outputs expected performance results of the layout of the integrated circuit.

Figure 2A:
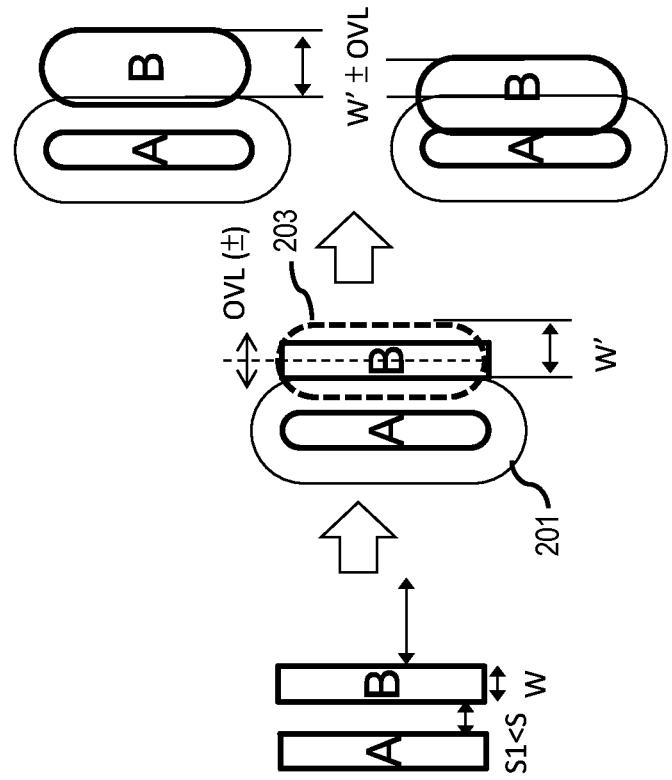
FIGS. 2a and 2b are diagrams illustrating example shifts between a first pattern A and a second pattern B formed in a multiple patterning lithography process, in accordance with one or more embodiments.
Figure 2B:
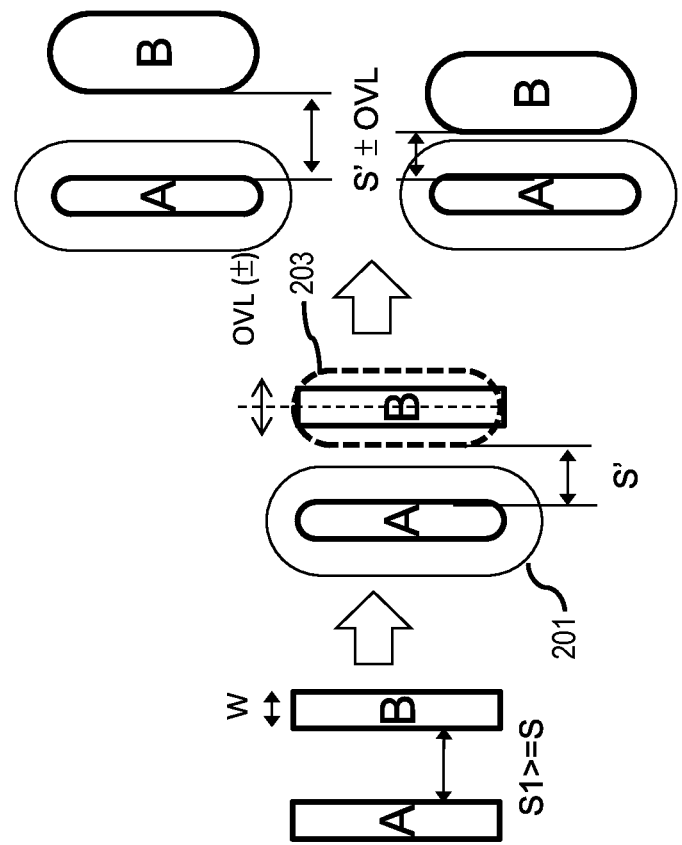

FIGS. 2a and 2b are diagrams illustrating example shifts between a first pattern A and a second pattern B formed in a multiple patterning lithography process, in accordance with one or more embodiments.

Transition shifts sometimes occur during the exposure of two patterns A and B. In some embodiments, patterns A and B are patterns in a same layer, such as a metal layer or any other layer involved in the formation of integrated circuits, such as a polysilicon layer. According to this example, patterns A and B are double patterning patterns, with pattern A being in a first lithography mask of a double patterning mask set, and pattern B in a second lithography mask of the same double patterning mask set. Accordingly, patterns A and B are formed on a wafer at different times. Ideally, pattern B should be at the position shown using dotted lines, as designed. However, there may be process variations causing pattern B to shift from an intended position. The shift causes the capacitance between patterns A and B to vary, and also causes the variation in performance values such as timing and noise, of the respective circuit.

In FIG. 2a, pattern B has a width W that is varied when the actual spacing S1 between pattern A and pattern B is less than design spacing S. A spacer 201 is applicable for defining narrow metal lines formed by the patterns A and B to achieve smaller pitch requirements of advanced nodes. In some embodiments, the spacer 201 is formed in and additional step following formation of the pattern A. Pattern B has a layout dimension (e.g., W) and a silicon exposure dimension 203. The final produced pattern A and pattern B after a mask shift that causes the actual spacing S1 to be less than the design spacing S has production pattern B with a width W'. The width W' varies as a function of the degree of overlap between pattern A and/or spacer 201 with pattern B and/or the silicon exposure dimension 203.

In FIG. 2b, pattern B has a width W that is equal to a width of the silicon exposure dimension 203 when the actual spacing S1 between pattern A and pattern B is greater than or equal to design spacing S. Spacer 201 does not have an effect of the production of pattern B because the spacing S' between pattern A and the silicon exposure dimension 203 results in there being no overlap between the spacer 201 and the silicon exposure dimension 203 and/or pattern B. The final produced pattern A and pattern B after a mask shift that causes the actual spacing S1 to be greater than or equal to the design spacing S has production pattern B and production pattern A separated by spacing S'. The spacing S' varies as a function of the degree of overlap (or non-overlap) between pattern A and/or spacer 201 with pattern B and/or the silicon exposure dimension 203.

In some embodiments, the patterns A and B are additionally or alternatively affected by a magnification shift (wherein the term "shift" may also be referred to as "variation"), wherein one of, or both of, patterns A and B are capable of having a variation from the designed sizes and/or a rotation shift, wherein pattern B has a relative rotation with relative to pattern A. Magnification shifts and rotation shifts also cause variations in performance values. In the following embodiments, the transition shift as shown in FIGS. 2a and 2b is used as an example to explain the concept of embodiments. However, the same concept is also applicable to account for variations in performance caused by magnification shift and/or rotation shift.

Figure 3:
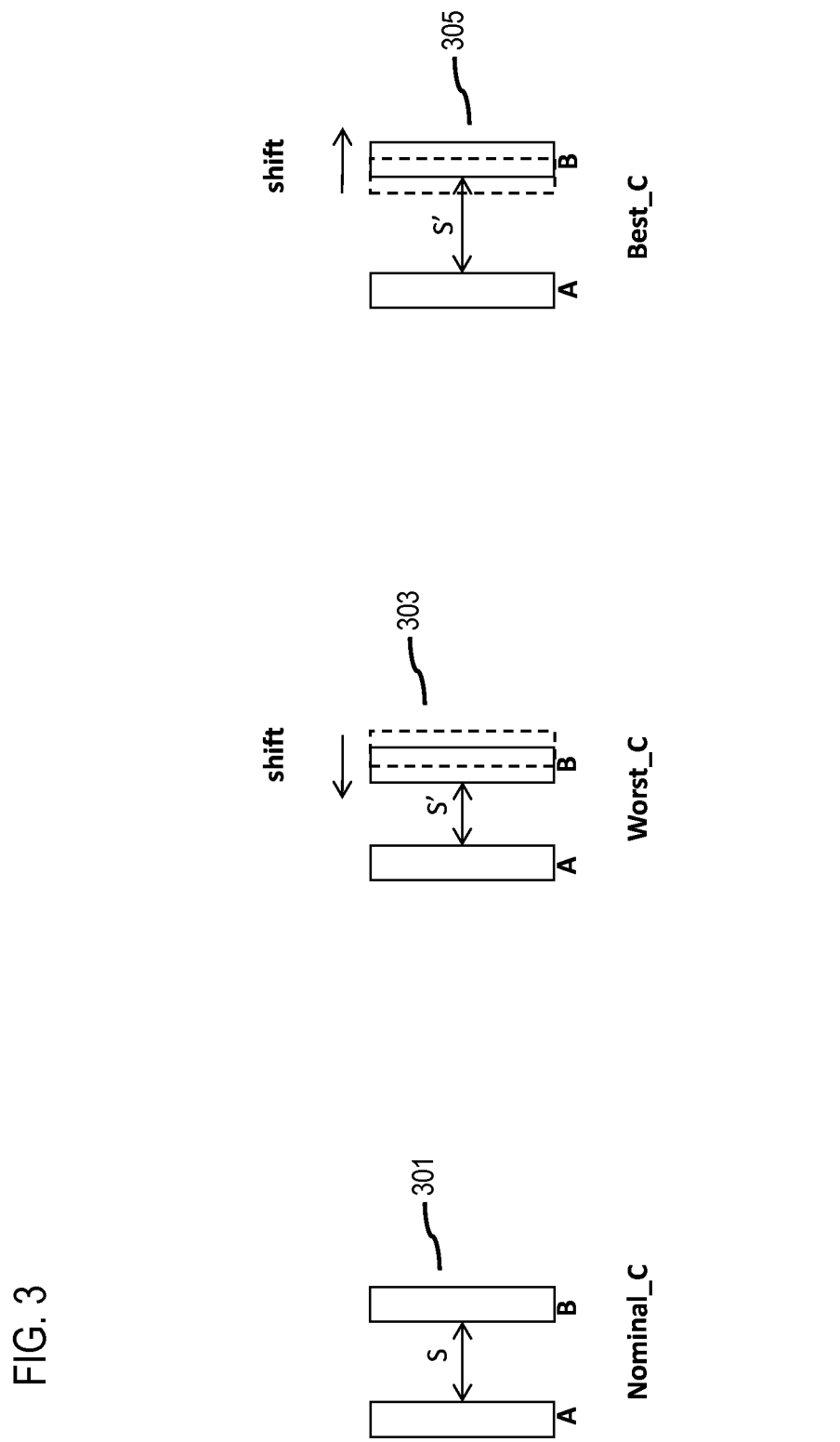
FIG. 3 is a diagram illustrating how spacing between a first pattern and a second pattern affect capacitance values in an integrated circuit performance test, in accordance with one or more embodiments.

FIG. 3 is a diagram illustrating how spacing between a first pattern and a second pattern affect capacitance values in an integrated circuit performance test, in accordance with one or more embodiments.

An integrated circuit layout 301 has patterns A and B separated by design spacing S. At design spacing S, the capacitance between pattern A and pattern B is a nominal or expected value. Integrated circuit layout 303 demonstrates that as the spacing between pattern A and pattern B decreases, capacitance increases toward a worst-case capacitance value. Integrated circuit layout 305 demonstrates that as the spacing S' between pattern A and pattern B increases, the capacitance decreases toward a best-case capacitance value.

In some embodiments, the nominal capacitance value, best-case capacitance value and worst-case capacitance value are simulated using dielectric constants K that are associated with the pattern A and B widths or thicknesses, as well as the spacing between the patterns A and B. For example, space-dependent dielectric constant tables are generated to make it possible to simulate or model the resistive capacitance that occurs between patterns A and B are various spacing values and pattern widths. These dielectric constant tables are stored in a database for retrieval by various integrated circuit simulation or performance assessment processes.

Figure 4:
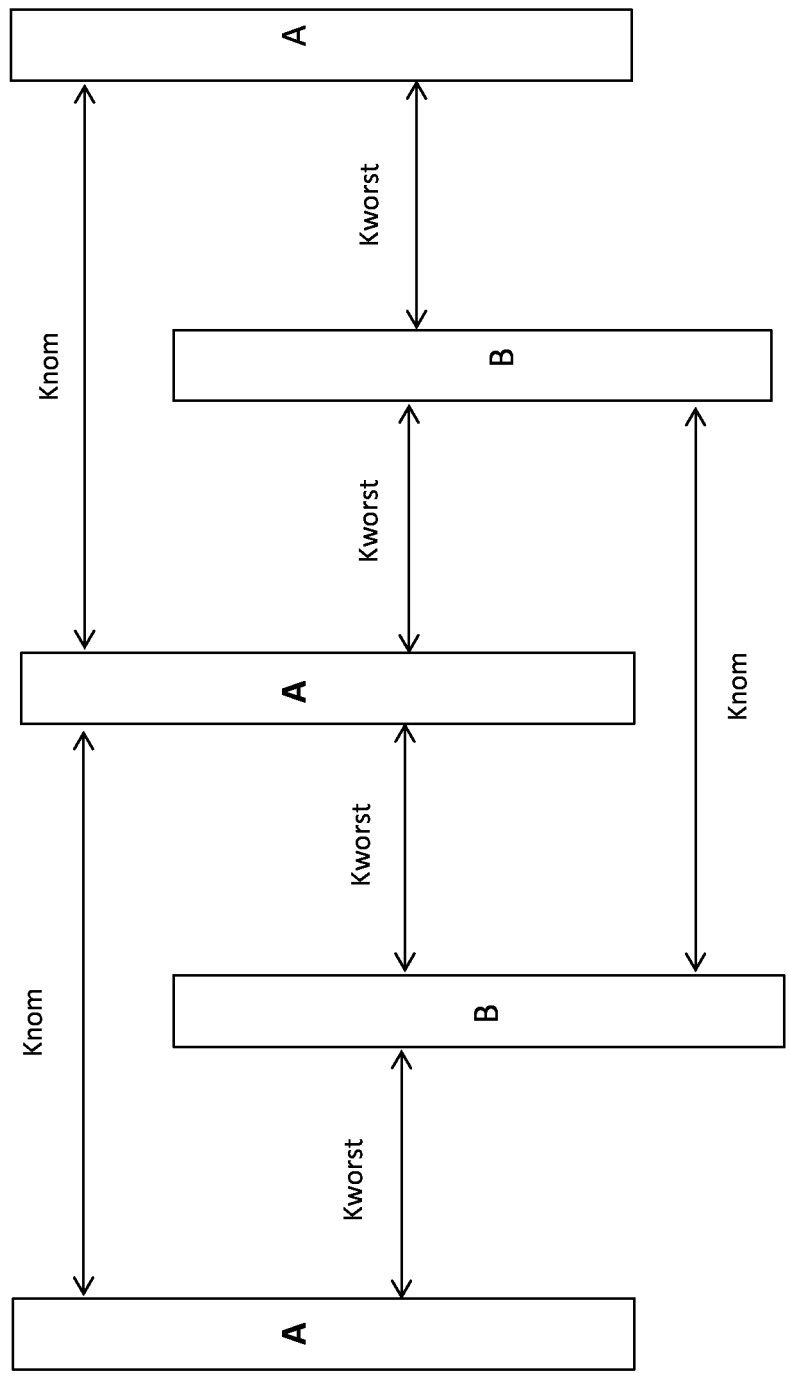
FIG. 4 is a diagram illustrating example dielectric constant relationships between same and different patterns, in accordance with one or more embodiments.

FIG. 4 is a diagram illustrating example dielectric constant relationships between same and different patterns, in accordance with one or more embodiments.

In some embodiments, a space-dependent dielectric constant table is generated to provide dielectric constant values for device simulations and performance tests. The dielectric constant values between different patterns such as pattern A and pattern B vary based, at least in part, on spacing values between pattern A and pattern B. The dielectric constant values between same patterns such as between two pattern A's or two pattern B's is also dependent on spacing between the two pattern A's or two pattern B's.

In some embodiments, one or more techfiles are generated. In some embodiments, the techfiles are data files or compositions that include one or more tables, sub-techfiles, or sub-files, populated with worst-case scenario performance factors such as, but not limited to, dielectric constant values and nominal dielectric constant values. In some embodiments, other performance factors include any suitable performance factor from which a capacitance or resistive capacitance is capably determined or extracted. For simplicity the example embodiments are discussed with respect to a dielectric constant, but the various discussed embodiments should not be so limited.

The worst-case scenario dielectric constant values are determined between differing patterns A and B for various spacing and width values of the patterns A and B, and the nominal dielectric constant values are determined between same patterns A and B for various spacing and width values of patterns A and B.

In some embodiments, the worst-case values are associated with maximum shifts that are possible or expected, and it is expected that the respective mask shifts when the layout of the respective integrated circuit is implemented on an actual wafer will not possibly exceed these values. The maximum shifts are also used to calculate a maximum performance variation.

In some embodiments, patterns A and B are configured to be different colors. As such, the EDA tool that is used to design an integrated circuit layout having patterns A and B is capable of generating a color-aware space dependent dielectric constant that comprises multiple dielectric constants on the same space.

Figure 5:
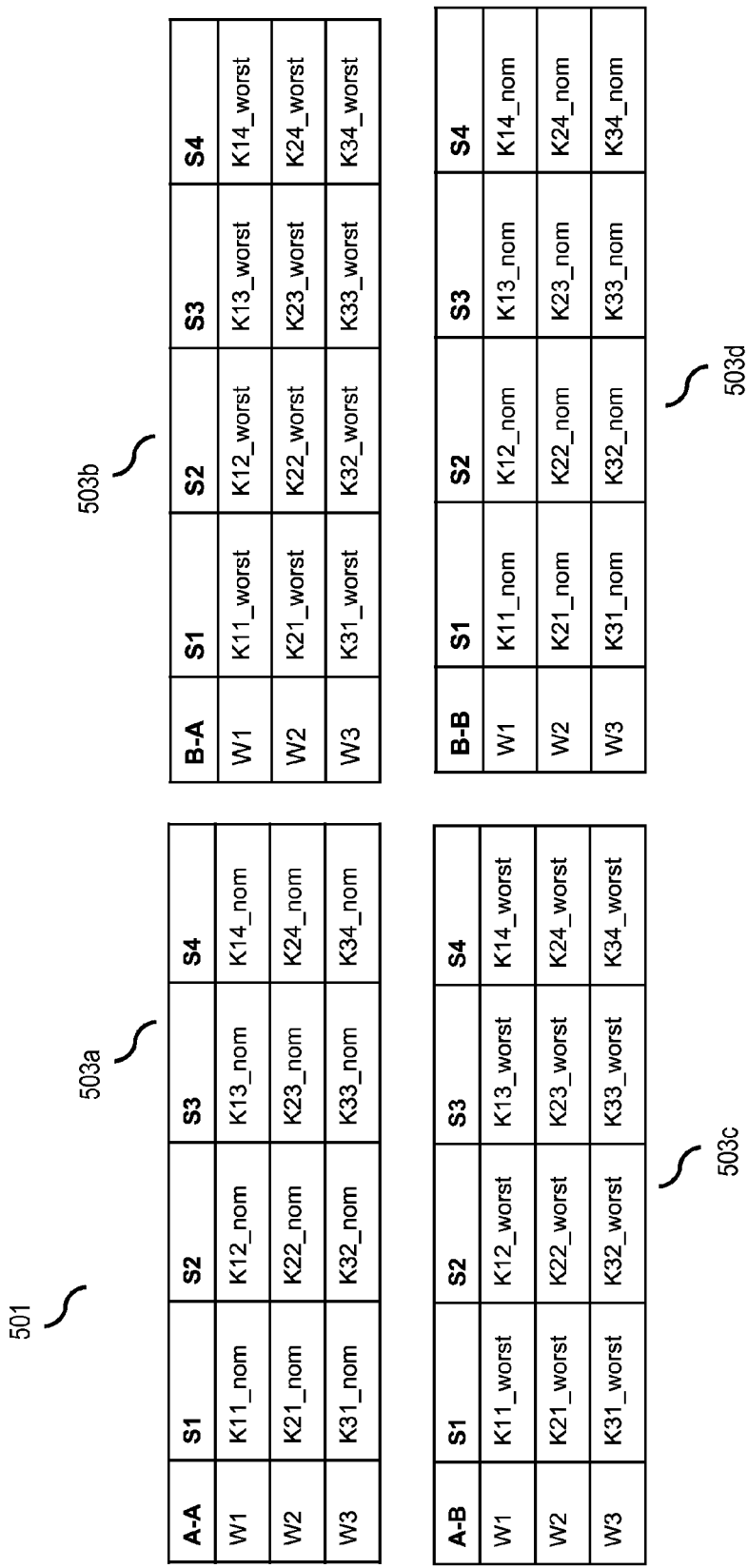
FIG. 5 illustrates a techfile associated with a double patterning integrated circuit layout, in accordance with one or more embodiments.

FIG. 5 illustrates a techfile 501 associated with a double patterning integrated circuit layout, in accordance with one or more embodiments.

In some embodiments, one or more techfiles 501 are generated to provide dielectric constant values for various combinations of spacing values between multiple patterns such as, but not limited to, pattern A and pattern B, and width values for pattern A and pattern B. Techfile 501 includes four sub-techfiles 503a-503d (collectively referred to as "sub-techfile 503") because there are two patterns (i.e., patterns A and B). In some embodiments, if there are n patterns in an integrated circuit layout, the techfile 501 comprises $n^2$ sub-techfiles 503.

Dielectric constant values are determined as nominal values and worst-case values for the various combinations of patterns, spacings, and widths. In each individual sub-techfile 503, the width value (e.g., W1-W3) corresponds to the first listed pattern in the first column of each sub-techfile 503. The spacing values (e.g., S1-S3) correspond to the spacing between the designated patterns A and B in the sub-techfiles 503. Though demonstrated as including three widths and four spacing values, the sub-techfiles 503, in some embodiments, include a greater or lesser number of spacing values and/or width values.

A change in widths W and/or spacing S results in the change in the dielectric constant from which the resistive capacitance between patterns A and B is capable of being extracted. For example, if width W is equal to W1, and spacing S is equal to S1, the respective dielectric constant is K11. If width W is equal to W1, and spacing S is equal to S2, the respective dielectric constant is K12. The contents in the techfile 501 are capable of being retrieved in subsequent simulations of the integrated circuit performance value to speed up a subsequent simulation.

In some embodiments, the EDA tool conducts a resistive capacitance extraction of an integrated circuit layout using the dielectric constant values populated in the techfile 501. In some embodiments, sub-techfiles 503 associated with pattern combinations A-A and B-B are capable of having dielectric constant values populated in techfile 501 that are different if the patterns A and B have different width variations, thickness variations, or other process effective variations. In other embodiments, the populated values are equal. Similarly, sub-techfiles 503 associated with pattern combinations of A-B and B-A are capable of having dielectric constant values that are different if the patterns A and B have different width variations, thickness variations, or other process effective variations. In other embodiments, the populated values are equal.

FIG. 6 illustrates a techfile 601 associated with a triple patterning integrated circuit layout, in accordance with one or more embodiments. The techfile 601 includes nine sub-techfiles 503, or $n^2$ sub-techfiles 503 because the techfile 601 includes dielectric constant values for three patterns—A, B and C.

Figure 7:
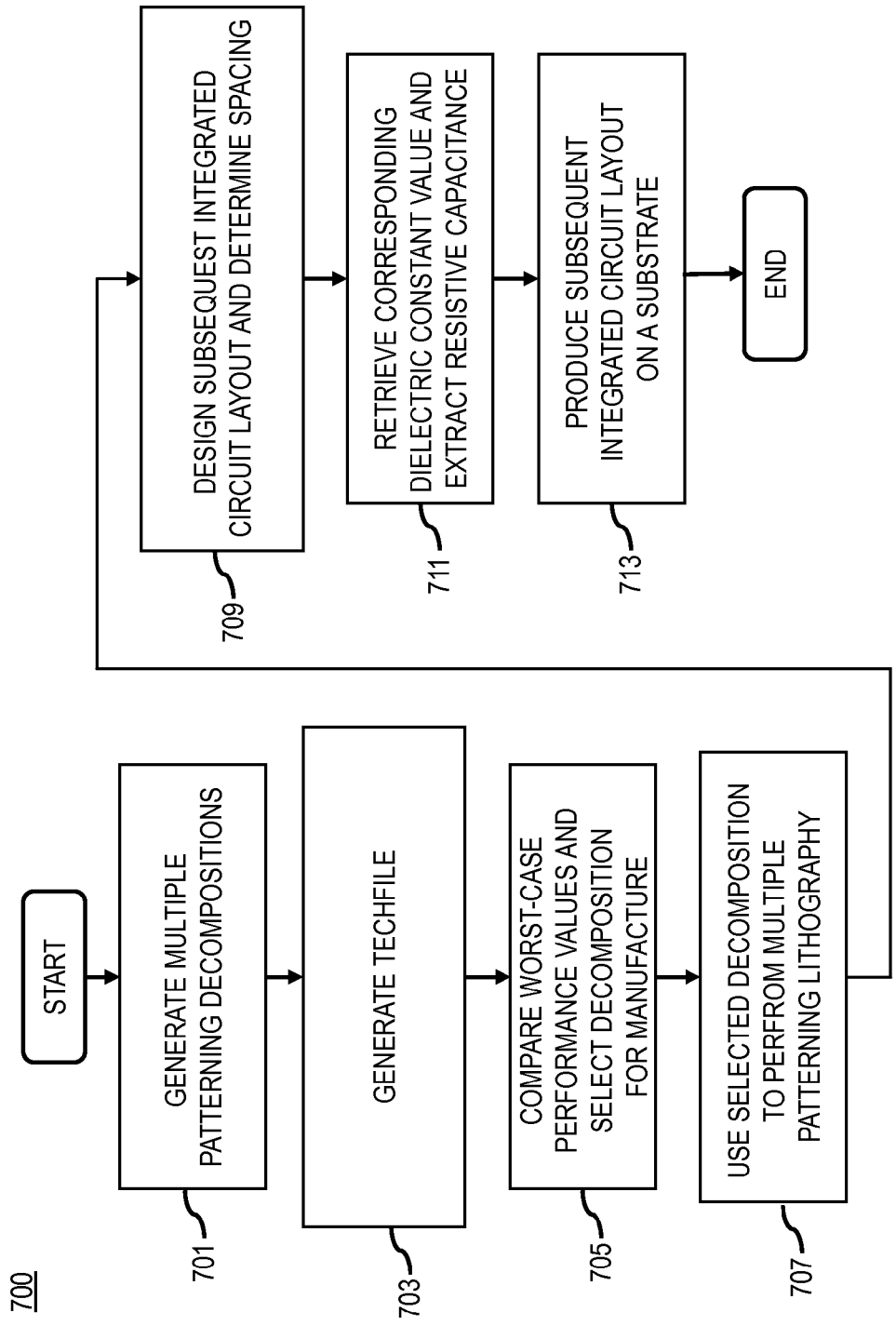
FIG. 7 is a flowchart of a method of generating a techfile used in an integrated circuit performance simulation, in accordance with one or more embodiments.

FIG. 7 is a flowchart of a method 700 of generating a techfile used in an integrated circuit performance simulation, in accordance with one or more embodiments. Method 700 begins with step 701 in which a processor such as processor 803 or a control module implemented in chip set 800 discussed in FIG. 8, executes an instruction to generate a plurality of multiple patterning decompositions associated with a layout of an integrated circuit. Each of the plurality of multiple patterning decompositions comprise a first pattern associated with a first mask, a second pattern associated with a second mask, the first mask and the second mask being two masks of a multiple patterning mask set, a width value associated with at least one of the first pattern or the second pattern, and a spacing value between the first pattern and the second pattern.

In some embodiments, an EDA tool configured to color code at least the first pattern and the second pattern is used to one or more of design or simulate the layout of the integrated circuit. The EDA tool is also configured to determine the spacing value between at least the first pattern and the second pattern based, at least in part, on a detection of a color difference between the first pattern and the second pattern.

In step 703, a techfile is generated comprising a plurality of dielectric constant values associated with the plurality of multiple patterning decompositions. The plurality of dielectric constant values are based on the width values and the spacing values associated with the plurality of multiple patterning decompositions. The techfile is generated by simulating, for at least some of the plurality of multiple patterning decompositions, a worst-case performance value yielding the plurality of dielectric constant values for the at least some of the plurality of multiple patterning decompositions, and populating the techfile with the worst-case performance value. The techfile is also generated by simulating, for at least some of the plurality of multiple patterning decompositions, various performance factors based on a plurality of widths and spacing values between and of same pattern types in the integrated circuit layout.

In some embodiments, the multiple patterning decomposition comprises n patterns and the techfile comprises $n^2$ sub-techfiles. In some embodiments, the $n^2$ sub-techfiles comprise a first sub-techfile associated with nominal dielectric constant values based on spacing values between at least two separated first patterns, and a range of width values of all of the first patterns; a second sub-techfile associated with nominal dielectric constant values based on spacing values between at least two separated second patterns, and a range of width values of all of the second patterns; a third sub-techfile associated with worst-case performance dielectric constant values based on spacing values between the first pattern and the second pattern, and a range of width values of all of the first patterns; and a fourth sub-techfile associated with worst-case performance dielectric constant values based on spacing values between the second pattern and the first pattern, and width values of all of the second patterns.

In step 705, the worst-case performance values are compared, and a decomposition is selected from the plurality of multiple patterning decompositions for manufacture. The selected decomposition is selected because it has a worst-case performance value that has the lowest dielectric constant value among the worst-case performance values, or a best-case scenario with respect to an extracted resistive capacitance from the dielectric constant values.

In step 707, the selected decomposition is used to perform a multiple patterning lithography on a substrate.

In step 709, a subsequent integrated circuit layout is designed, and a shifting of one or more of the first mask or the second mask is determined, and a resultant spacing caused by the determined shift is determined. In some embodiments, the EDA tool configured to color code the at least two patterns is used to one or more of design or simulate the subsequent integrated circuit layout. The EDA tool is also configured to determine the spacing value between at least the first pattern and the second pattern based, at least in part, on a detection of a color difference between the first pattern and the second pattern and extract the resistive capacitance values from the dielectric constant values stored in the techfile from a previous integrated circuit layout performance simulation.

In step 711, a dielectric constant value is retrieved from the techfile or sub-techfile that corresponds with the determined resultant spacing to account for the determined shift in the simulation, and a resistive capacitance of the given layout is extracted based, at least in part, on the techfile. The determined shift causes a misalignment between the first mask and the second mask in a lithography process thereby causing one of an overlap between the first pattern and the second pattern or an excessive spacing value between the first pattern and the second pattern. But, because the effect of the determined shift is capable of being quickly estimated based on the generated techfile, a determination can be quickly and accurately made to determine whether a device having experienced a determined shift in masks will operate as designed. If so, then the process continues to step 713. If not, then the device is discarded or refurbished.

In step 713, the subsequent integrated circuit layout is produced on a substrate.

As discussed, when the integrated circuit (layout) is manufactured on wafers or substrates, masks associated with various patterns such as pattern A and pattern B sometimes have a mask shift with relative to each other, which includes a transition shift, a magnification shift, and/or a rotation shift. At the time of design, it cannot be predicted what the actual mask shift will be when the integrated circuit is manufactured. But, because the worst-case performance values that could result from the mask shift are capable of being simulated, by selecting the decomposition whose worst-case performance values are the best among the worst-case performance values of all available decompositions, it can be guaranteed that even if the worst-case scenario occurs, a minimum performance value requirement for the integrated circuit can still be satisfied, and an optimum performance value can be achieved.

With the worst-case performance values being estimated, a designer, at the time of design, may perform a design margin analysis and check whether the worst-case performance, such as the worst-case dielectric constant or resistive capacitance, is in the design margin or not. Further, with the adoption of the decomposition whose worst-case performance value being the best among all available decompositions, a foundry is then able to manufacture integrated circuits using the best possible decomposition scheme.

The processes described herein for generating a techfile used in an integrated circuit performance simulation may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
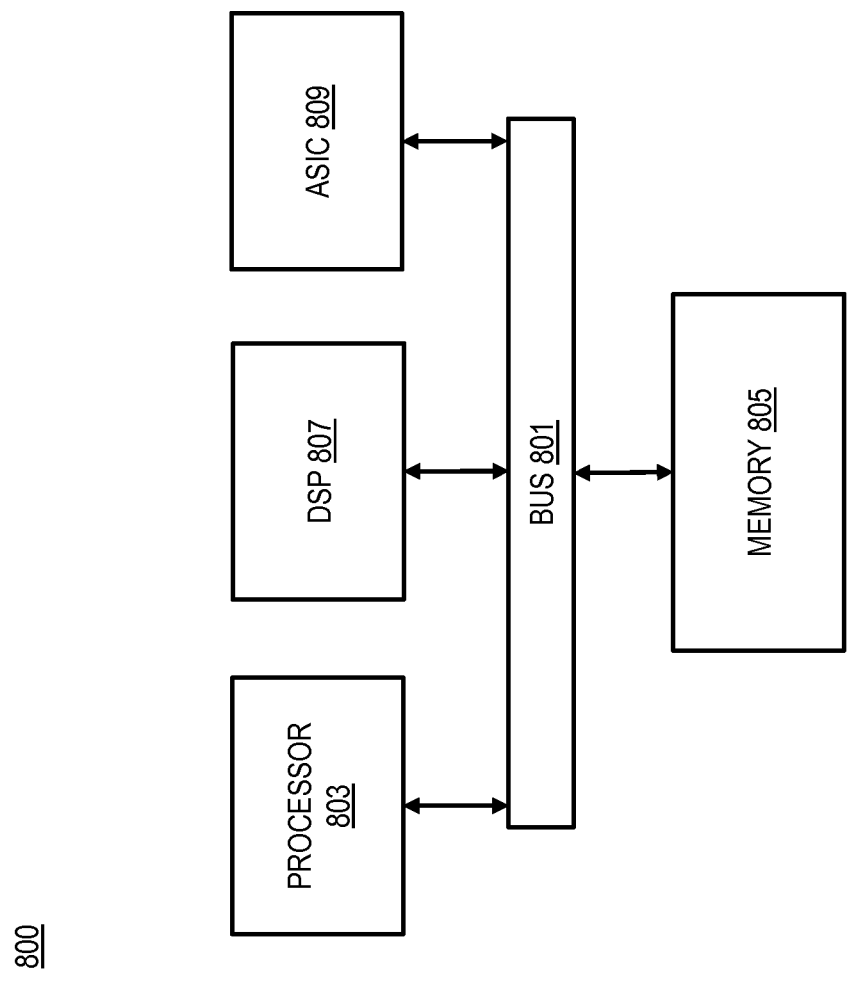
FIG. 8 illustrates a chip set or chip upon which or by which an embodiment is implemented.

FIG. 8 illustrates a chip set or chip 800 upon which or by which an embodiment is implemented. Chip set 800 is programmed to generate a techfile used in an integrated circuit performance simulation, as described herein, and includes, for example, bus 801, processor 803, memory 805, DSP 807 and ASIC 809 components.

The processor 803 and memory 805 are incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 are implemented in a single chip. It is further contemplated that in certain embodiments the chip set or chip 800 is implemented as a single "system on a chip." It is further contemplated that in certain embodiments a separate ASIC would not be used, for example, and that all relevant functions as disclosed herein would be performed by a processor or processors, e.g., processor 803. Chip set or chip 800, or a portion thereof, constitutes a mechanism for performing one or more steps of generating a techfile used in an integrated circuit performance simulation.

In one or more embodiments, the chip set or chip 800 includes a communication mechanism such as bus 801 for passing information among the components of the chip set 800. Processor 803 has connectivity to the bus 801 to execute instructions and process information stored in, for example, the memory 805. In some embodiments, the processor 803 is also accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 803 performs a set of operations on information as specified by computer program code related to generating a techfile used in an integrated circuit performance simulation. The computer program code is a set of instructions or statements providing instructions for the operation of the processor and/or the computer system to perform specified functions.

The processor 803 and accompanying components have connectivity to the memory 805 via the bus 801. The memory 805 includes one or more of dynamic memory (e.g., RAM, magnetic disk, writable optical disk, etc.) and static memory (e.g., ROM, CD-ROM, etc.) for storing executable instructions that when executed perform the steps described herein to generate a techfile used in an integrated circuit performance simulation. The memory 805 also stores the data associated with or generated by the execution of the steps.

In one or more embodiments, the memory 805, such as a random access memory (RAM) or any other dynamic storage device, stores information including processor instructions for generating a techfile used in an integrated circuit performance simulation. Dynamic memory allows information stored therein to be changed by system 100. RAM allows a unit of information stored at a location called a memory address to be stored and retrieved independently of information at neighboring addresses. The memory 805 is also used by the processor 803 to store temporary values during execution of processor instructions. In various embodiments, the memory 805 is a read only memory (ROM) or any other static storage device coupled to the bus 801 for storing static information, including instructions, that is not changed by the system 100. Some memory is composed of volatile storage that loses the information stored thereon when power is lost. In some embodiments, the memory 805 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 803, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, or another medium from which a computer can read. The term computer-readable storage medium is used herein to refer to a computer-readable medium.

One aspect of this description relates to a method comprising generating a plurality of multiple patterning decompositions associated with a layout of an integrated circuit. Each of the plurality of multiple patterning decompositions comprises a first pattern associated with a first mask, a second pattern associated with a second mask, the first mask and the second mask being two masks of a multiple patterning mask set, a width value associated with at least one of the first pattern or the second pattern, and a spacing value between the first pattern and the second pattern.

The method also comprises generating a file comprising a plurality of dielectric constant values associated with the plurality of multiple patterning decompositions, the plurality of dielectric constant values being based on the width values and the spacing values associated with the plurality of multiple patterning decompositions.

Another aspect of this description relates to an apparatus comprising at least one processor, and at least one memory including computer program code for one or more programs, the at least one memory and the computer program code configured to, with the at least one processor, execute an instruction to cause the apparatus to generate a plurality of multiple patterning decompositions associated with a layout of an integrated circuit. Each of the plurality of multiple patterning decompositions comprise a first pattern associated with a first mask, a second pattern associated with a second mask, the first mask and the second mask being two masks of a multiple patterning mask set, a width value associated with at least one of the first pattern or the second pattern, and a spacing value between the first pattern and the second pattern.

The apparatus is also caused to generate a file comprising a plurality of dielectric constant values associated with the plurality of multiple patterning decompositions, the plurality of dielectric constant values being based on the width values and the spacing values associated with the plurality of multiple patterning decompositions.

Still another aspect of this description relates to a computer-readable storage medium carrying one or more sequences of one or more instructions which, when executed by one or more processors, cause an apparatus to at least generate a plurality of multiple patterning decompositions associated with a layout of an integrated circuit. Each of the plurality of multiple patterning decompositions comprise a first pattern associated with a first mask, a second pattern associated with a second mask, the first mask and the second mask being two masks of a multiple patterning mask set, a width value associated with at least one of the first pattern or the second pattern, and a spacing value between the first pattern and the second pattern.

The apparatus is also caused to generate a file comprising a plurality of dielectric constant values associated with the plurality of multiple patterning decompositions, the plurality of dielectric constant values being based on the width values and the spacing values associated with the plurality of multiple patterning decompositions. The apparatus is further caused to simulate, for at least some of the plurality of multiple patterning decompositions, a worst-case performance value yielding the plurality of dielectric constant values for the at least some of the plurality of multiple patterning decompositions. The multiple patterning decomposition comprises n patterns and the file comprises n2 sub-files.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. Although features of various embodiments are expressed in certain combinations among the claims, it is contemplated that these features can be arranged in any combination and order. It is therefore intended that the protection granted hereon be limited only by the definition contained in the appended claims and equivalents thereof.

What is claimed is:

1. A method comprising:
generating a plurality of multiple patterning decompositions associated with a layout of an integrated circuit, each of the plurality of multiple patterning decompositions comprising:
a first pattern associated with a first mask;
a second pattern associated with a second mask, the first mask and the second mask being two masks of a multiple patterning mask set;
a width value associated with at least one of the first pattern or the second pattern; and
a spacing value between the first pattern and the second pattern; and
generating a file comprising a plurality of dielectric constant values associated with the plurality of multiple patterning decompositions, the plurality of dielectric constant values being based on the width values and the spacing values associated with the plurality of multiple patterning decompositions,
wherein generating the file comprises:
simulating, for at least some of the plurality of multiple patterning decompositions, a worst-case performance value yielding the plurality of dielectric constant values for the at least some of the plurality of multiple patterning decompositions; and populating the file with the worst-case performance value.

2. The method of claim 1, further comprising:
comparing the worst-case performance values;
selecting a decomposition from the plurality of multiple patterning decompositions, the selected decomposition having a worst-case performance value that has the lowest dielectric constant value among the worst-case performance values; and
using the selected decomposition to perform a multiple patterning lithography on a substrate.

3. The method of claim 1, further comprising:
determining a shift of one or more of the first mask or the second mask;
determining a resultant spacing caused by the determined shift;
retrieving a dielectric constant value from the file that corresponds with the determined resultant spacing to account for the determined shift in the simulation; and
extracting a resistive capacitance of a given layout based, at least in part, on the file.

4. The method of claim 3, wherein the determined shift causes a misalignment between the first mask and the second mask in a lithography process thereby causing one of an overlap between the first pattern and the second pattern or an excessive spacing value between the first pattern and the second pattern.

5. The method of claim 1, wherein the multiple patterning decomposition comprises n patterns and the file comprises $n^2$ sub-files.

6. The method of claim 5, wherein the $n^2$ sub-files comprise:
a first sub-file associated with nominal dielectric constant values based on spacing values between at least two separated first patterns, and a range of width values of all of the first patterns;
a second sub-file associated with nominal dielectric constant values based on spacing values between at least two separated second patterns, and a range of width values of all of the second patterns;
a third sub-file associated with the worst-case performance dielectric constant values based on spacing values between at least one first pattern and at least one second pattern, and a range of width values of all of the first patterns; and
a fourth sub-file associated with the worst-case performance dielectric constant values based on spacing values between the at least one second pattern and the at least one first pattern, and width values of all of the second patterns.

7. The method of claim 6, wherein the dielectric constant values of the third sub-file and the fourth sub-file comprise equal values.

8. The method of claim 7, wherein the multiple patterning decomposition is a triple patterning decomposition having three patterns.

9. The method of claim 1, implemented by an electronic design automation tool configured to color code at least the first pattern and the second pattern, the method further comprising:
determining the spacing value between at least the first pattern and the second pattern based, at least in part, on a detection of a color difference between the first pattern and the second pattern.

10. The method of claim 1, wherein a circuit is manufactured based on the file.

11. The method of claim 1, wherein the generating the file further comprises:
generating a first sub-file associated with the worst-case performance dielectric constant values based on spacing values between at least one first pattern and at least one second pattern, and a range of width values of all of the first patterns; and
generating a second sub-file associated with the worst-case performance dielectric constant values based on spacing values between the at least one second pattern and the at least one first pattern, and width values of all of the second patterns.

12. An apparatus comprising:
at least one processor; and
at least one memory including computer program code for one or more programs,
the at least one memory and the computer program code configured to, with the at least one processor, execute an instruction to cause the apparatus to perform at least the following,
generating a plurality of multiple patterning decompositions associated with a layout of an integrated circuit, each of the plurality of multiple patterning decompositions comprising:
a first pattern associated with a first mask;
a second pattern associated with a second mask, the first mask and the second mask being two masks of a multiple patterning mask set;
a width value associated with at least one of the first pattern or the second pattern; and
a spacing value between the first pattern and the second pattern; and
generating a file comprising a plurality of dielectric constant values associated with the plurality of multiple patterning decompositions, the plurality of dielectric constant values being based on the width values and the spacing values associated with the plurality of multiple patterning decompositions,
wherein generating the file comprises:
simulating, for at least some of the plurality of multiple patterning decompositions, a worst-case performance value yielding the plurality of dielectric constant values for the at least some of the plurality of multiple patterning decompositions; and
populating the file with the worst-case performance value.

13. The apparatus of claim 12, wherein the apparatus is further caused to:
compare the worst-case performance values;
select a decomposition from the plurality of multiple patterning decompositions, the selected decomposition having a worst-case performance value that has the lowest dielectric constant value among the worst-case performance values; and
performing a multiple patterning lithography on a substrate using the selected decomposition.

14. The apparatus of claim 12, wherein the apparatus is further caused to:
determine a shift of one or more of the first mask or the second mask;
determine a resultant spacing caused by the determined shift;
retrieve a dielectric constant value from the file that corresponds with the determined resultant spacing to account for the determined shift in the simulation; and extract a resistive capacitance of a given layout based, at least in part, on the file.

15. The apparatus of claim 14, wherein the determined shift causes a misalignment between the first mask and the second mask in a lithography process thereby causing one of an overlap between the first pattern and the second pattern or an excessive spacing value between the first pattern and the second pattern.

16. The apparatus of claim 12, wherein the multiple patterning decomposition comprises n patterns and the file comprises $n^2$ sub-files.

17. The apparatus of claim 16, wherein the $n^2$ sub-files comprise:
a first sub-file associated with nominal dielectric constant values based on spacing values between at least two separated first patterns, and a range of width values of all of the first patterns;
a second sub-file associated with nominal dielectric constant values based on spacing values between at least two separated second patterns, and a range of width values of all of the second patterns;
a third sub-file associated with the worst-case performance dielectric constant values based on spacing values between the first pattern and the second pattern, and a range of width values of all of the first patterns; and
a fourth sub-file associated with the worst-case performance dielectric constant values based on spacing values between the second pattern and the first pattern, and width values of all of the second patterns.

18. The apparatus of claim 17, wherein the multiple patterning decomposition is a triple patterning decomposition having three patterns.

19. The apparatus of claim 12, implemented as an electronic design automation tool, wherein the apparatus is further caused to:
color code the at least two patterns; and
determine the spacing value between at least the first pattern and the second pattern based, at least in part, on a detection of a color difference between the first pattern and the second pattern.

20. A non-transitory computer-readable storage medium carrying one or more sequences of one or more instructions which, when executed by one or more processors, cause an apparatus to at least perform the following:
generating a plurality of multiple patterning decompositions associated with a layout of an integrated circuit, each of the plurality of multiple patterning decompositions comprising:
a first pattern associated with a first mask;
a second pattern associated with a second mask, the first mask and the second mask being two masks of a multiple patterning mask set;
a width value associated with at least one of the first pattern or the second pattern; and
a spacing value between the first pattern and the second pattern; and
generating a techfile comprising a plurality of dielectric constant values associated with the plurality of multiple patterning decompositions, the plurality of dielectric constant values being based on the width values and the spacing values associated with the plurality of multiple patterning decompositions; and
simulating, for at least some of the plurality of multiple patterning decompositions, a worst-case performance value yielding the plurality of dielectric constant values for the at least some of the plurality of multiple patterning decompositions,
wherein the multiple patterning decomposition comprises n patterns and the techfile comprises $n^2$ sub-techfiles.

* * * * *